United States Patent [19]

Manasas

[11] 4,307,816

[45] Dec. 29, 1981

[54] METER CLOSURE

[75] Inventor: A. Paul Manasas, Inman, S.C.

[73] Assignee: Hersey Products, Inc., Dedham, Mass.

[21] Appl. No.: 127,540

[22] Filed: Mar. 6, 1980

[51] Int. Cl.³ .............................................. B65D 41/04
[52] U.S. Cl. ....................................... 220/288; 138/89
[58] Field of Search ..................... 220/288, 3; 215/356; 138/89

[56] References Cited

U.S. PATENT DOCUMENTS

| | | |
|---|---|---|
| 1,958,582 | 5/1934 | Kerr et al. |
| 3,487,442 | 12/1969 | Rossmann ........................... 220/288 |
| 3,664,540 | 6/1970 | Witkin ................................ 220/288 |
| 3,669,301 | 6/1972 | Witkin ................................ 220/288 |

Primary Examiner—George T. Hall

[57] ABSTRACT

A threaded closure having force-transmitting thread surfaces that face inwardly, whereby the forces acting on a casing wall directly above the closure imposed directly by a pressurized liquid and the forces on the casing wall adjacent to the closure transmitted from the top of the closure and through the closure threads are subtractive.

4 Claims, 2 Drawing Figures

METER CLOSURE

FIELD OF THE INVENTION

This invention relates to threaded closures, particularly for water meters.

BACKGROUND OF THE INVENTION

Water meters generally have disc-shaped closures threadedly attached to the bottoms of their casings. The pressurized water within the casing imposes two radial forces on the casing wall. The first force occurs at the inner surface of the casing wall directly above the closure and is directed outwardly. The second force occurs at the wall immediately adjacent to the closure threads and is caused by forces on the upper surface of the closure that are transmitted through the closure at the lower thread surfaces. When standard screw threads are used, the lower force-transmitting surfaces of the closure threads face outwardly and cause the second radial force on the wall to be directed outwardly and additive to the first force. In such a structure thicker walls are needed to resist the sum of these radial burst forces.

SUMMARY OF THE INVENTION

We have discovered that the radial burst forces acting on the casing wall can be reduced by providing the closure with threads having force-transmitting surfaces that are facing inwardly. In such a structure the outward forces directly imposed on the wall by the fluid are subtractive from the inward forces on the wall transmitted by the closure. In such a structure thinner walls can be used. Furthermore, the pulling in of the housing on the closure caused in our invention increases the thread contact area and accordingly, the thickness of the threaded portions resisting forces in shear.

In preferred embodiments our invention features having the force transmitting surfaces of the closure threads constructed at a 60° angle with the closure axis and the casing and enclosure made of molded polycarbonate.

Preferred Embodiment

We turn now to a description of the drawings and structure and operation of the preferred embodiment.

DRAWINGS

STRUCTURE

Figure 1:
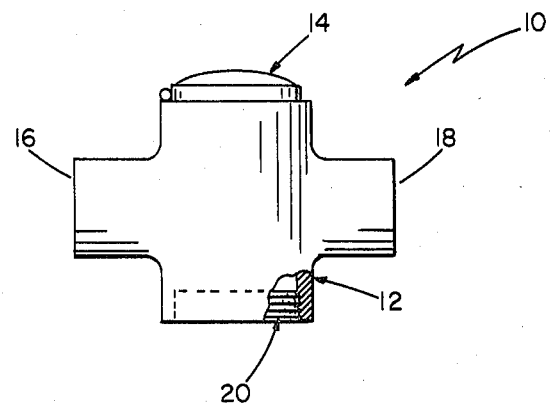
FIG. 1 is a diagrammatic side elevation of a meter according to the invention.

There is shown in FIG. 1 meter 10 having casing 12, meter cover 14, inlet 16, outlet 18, and closure 20. The meter casing 12 and closure 20 are made of molded polycarbonate.

Figure 2:
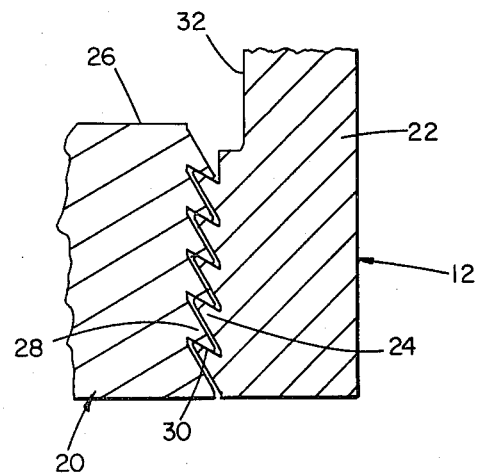
FIG. 2 is a partial vertical sectional view taken through the lower right-hand side of the meter of FIG. 1.

In FIG. 2 is shown wall 22 of casing 12 having threads 24 extending inwardly and upwardly. Closure 20 has upper pressurized-fluid-contacting surface 26 and threads 28 that mate with the threads of wall 22. The lower surfaces 30 of closure threads 28 make a 60° angle with the axis of closure 20 and face inwardly.

Operation

In operation, closure 20 is screwed into meter 10 at its bottom. When the casing 12 is filled with fluid under pressure, a force is exerted against the closure top surface 26, which presses the closure 20 downwardly. The fluid will at the same time exert pressure against the inner surface 32 of the wall 22 immediately above the closure and press the wall 22 outwardly. When closure 22 is pressed downwardly, the lower surfaces 30 of its threads press against wall threads 24 inwardly and downwardly. The forces exerted by surfaces 30 are subtractive, against the wall, from the force at 32.

What is claimed is:

1. A pressurizable article of manufacture comprising a casing for enclosing pressurized liquid in a zone and a closure having an axis and attached in said casing by a thread,
    said thread having a first surface for each thread closer to said zone and a second force-transmitting surface for each thread farther from said zone, said force-transmitting surface defining with said axis away from said zone acute angles and thus inclined inwardly toward said zone,
    whereby the forces acting on a casing wall directly above said closure imposed directly by said pressurized liquid and the forces transmitted through said casing wall adjacent said closure through said closure threads are substractive.

2. The article of claim 1 which is a water meter.

3. The meter of claim 2 in which said force transmitting surfaces are constructed at a 60° angle with the axis of said closure.

4. The meter of claim 3 in which said casing and said closure are made of plastic.

* * * * *